Nov. 17, 1959

C. L. COHEN 2,912,883

DRIVE MECHANISM

Filed May 8, 1958

2 Sheets-Sheet 1

INVENTOR
CHARLES L. COHEN
BY
ATTORNEY

Nov. 17, 1959　　　　　C. L. COHEN　　　　　2,912,883
DRIVE MECHANISM

Filed May 8, 1958　　　　　　　　　　　　　2 Sheets-Sheet 2

INVENTOR
CHARLES L. COHEN
BY
ATTORNEY

United States Patent Office 2,912,883
Patented Nov. 17, 1959

2,912,883
DRIVE MECHANISM

Charles L. Cohen, Hyattsville, Md., assignor to ACF Industries, Incorporated, New York, N.Y., a corporation of New Jersey Application May 8, 1958, Serial No. 733,938

14 Claims. (Cl. 74—665)

This invention relates to drive mechanisms and has for an object the provision of a mechanism wherein a power shaft drives a plurality of driven shafts in sequence to provide precise continuity of motion during stopping of one driven shaft and starting of a second driven shaft.

Another object of the invention resides in the provision of a drive mechanism wherein the driven shafts are connected to potentiometers, or other devices, to be operated in sequence with continuity of motion.

A further object of the invention resides in the provision of a drive mechanism embodying a plurality of devices driven in sequence from a power shaft through individual magnetic coupling means.

Another object of the invention resides in the provision of a drive mechanism wherein a plurality of arms are secured on a drive shaft to move into and out of engagement with their respective permanent magnets in sequence to alternately drive their respective driven devices, said drive shaft being driven by a reversible electric motor controlled by limit switches to limit the arcuate movement of the arms.

Another object of the invention is to provide a drive mechanism which is relatively simple and inexpensive in construction and reliable in operation.

Figure 1:
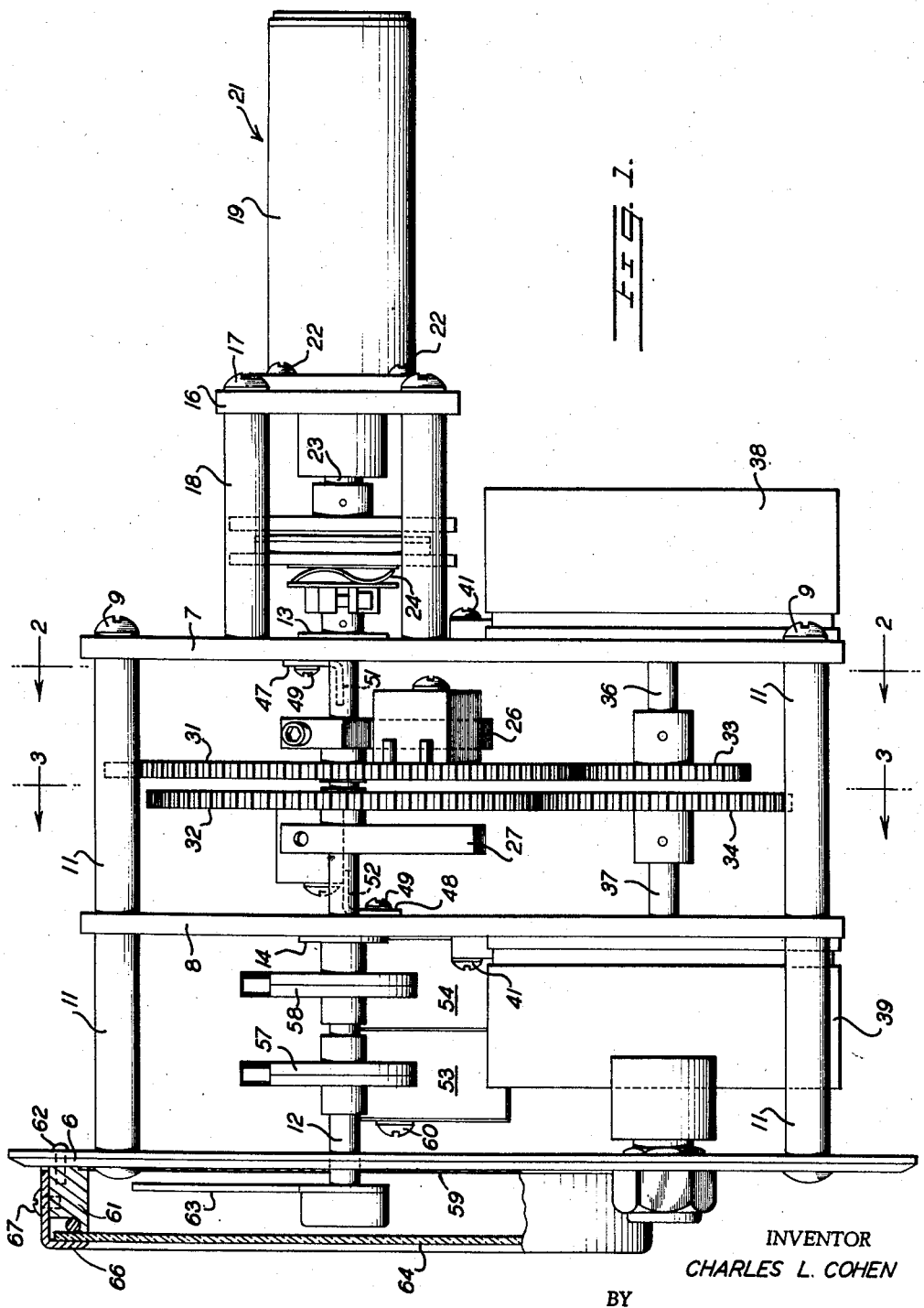

The invention embodies other novel features, details of construction and arrangement of parts which are hereinafter set forth in the specification and claims and illustrated in the accompanying drawings, forming part thereof, wherein:

Fig. 1 is a side elevation illustrating a drive mechanism embodying features of the invention.

Figure 3:
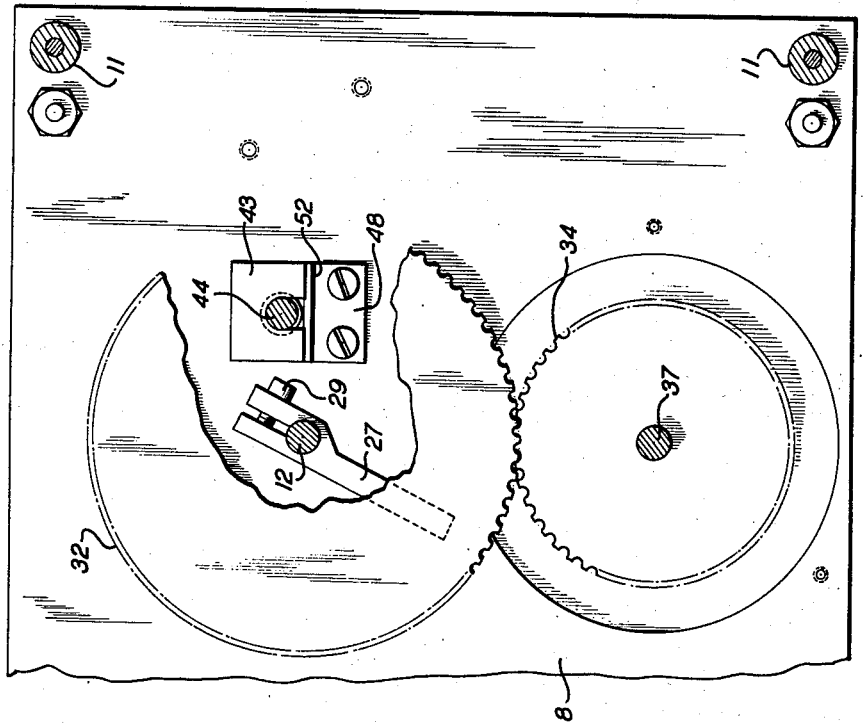
Figure 4:
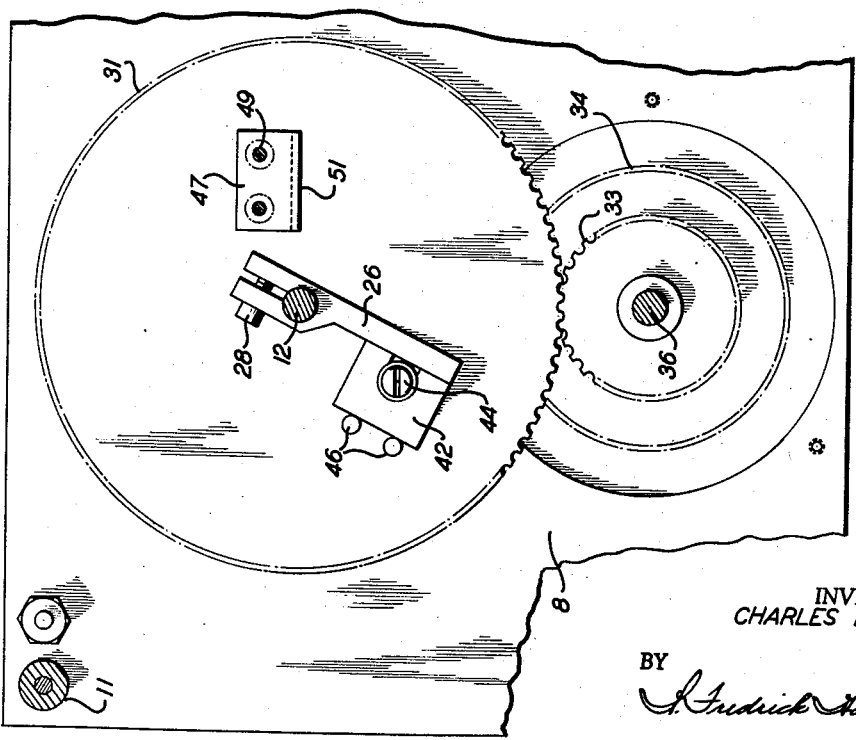

Figs. 2 and 3 are transverse sections taken along the lines 2—2 and 3—3, respectively, of Fig. 1.

Referring now to the drawings for a better understanding of the invention, the drive mechanism is shown as comprising a front plate 6, a back plate 7, and an intermediate plate 8 secured together in spaced parallel relationship by means of bolts 9 and spacing sleeves 11. The plates are formed with aligned openings to receive a drive shaft 12 which is journaled in bearings 13 and 14 mounted on the back plate 7 and intermediate plate 8, respectively.

A motor mounting plate 16 is secured to the back plate 7 by means of bolts 17 and spacing sleeves 18 and is formed with an aperture to receive one end of the housing 19 of an electric motor 21, the motor housing being secured to the mounting plate by screws 22. The electric motor is of the reversible type provided with a built-in speed reduction unit adapted to rotate the motor shaft 23 at, for example, approximately 5 R.P.M. The motor shaft 23 and drive shaft 12 are interconnected by a conventional friction clutch 24.

A pair of ferrous actuating arms 26 and 27, formed with bifurcated shaft receiving ends, are adjustably secured to the drive shaft 12 by means of screws 28 and 29, respectively. A pair of driving gears 31 and 32, formed of aluminum or other non-ferrous material, are journaled for free rotational movement on the drive shaft 12, between the actuating arms 26 and 27, for meshing engagement with driven gears 33 and 34, respectively, secured to driven shafts 36 and 37, respectively, of potentiometers 38 and 39, respectively. The potentiometers 38 and 39 are secured to the back wall 7 and intermediate wall 8, respectively, by means of screws 41.

Permanent magnets 42 and 43 are secured to the driving gears 31 and 32, respectively, for detachable magnetic coupling engagement with their respective steel actuating arms 26 and 27 to impart rotational movement to their respective driving gears 31 and 32. Each magnet is secured in fixed position on its respective driving gear by means of a cap screw 44 and a pair of abutment pins 46—46.

Stop members 47 and 48, formed of steel, are secured to the back plate 7 and intermediate plate 8 by means of cap screws 49 for abutting engagement with their respective magnets 42 and 43 during rotation of the actuating arms. As illustrated in Fig. 1, the stop members 47 and 48 have abutment surfaces 51 and 52, respectively, disposed in a common plane to engage their respective magnets 42 and 43.

The reversible electric motor 21 is adapted to be connected in a circuit to a source of current. To limit the operation of the motor in either direction of rotation, limit switches 53 and 54 are interposed in the electrical motor circuit to be actuated by cams 57 and 58, respectively, fixed on the drive shaft 12. The switches are secured to the intermediate plate 8 by means of screws 60. A manually operable switch is also provided in the circuit to control the operation of the motor.

A disk dial 59 of sheet material is secured to the front face of the front plate 6 by means of a retaining ring 61 and screws 62 and is stamped or printed with suitable graduations. A pointer 63 is secured to the drive shaft 12 for registry with the graduations on the dial to visually indicate the rotational position of the drive shaft and the setting of the potentiometers 38 and 39 or other devices controlled by movement of the drive shaft. To protect the dial 59 from dirt and moisture, a transparent glass cover 64 is secured in leakproof engagement against the retaining ring 61 by means of a cover ring 66 and screws 67.

When the motor 21 is energized to rotate the drive shaft 12 in a clockwise direction, as illustrated in Figs. 2 and 3 the actuating arm 26 moves the magnet 42 into abutting engagement with the stop member 48, and the actuating arm 26 moves the magnet 42 out of engagement with the stop member 47. When the shaft 12 is rotated in a counterclockwise direction as illustrated in Figs. 2 and 3 the actuating arm 26 moves the magnet 42 into abutting engagement against the stop 47, and the arm 27 moves the magnet 43 out of engagement with the stop member 48. Rotation of the drive shaft 12 thus acts to drive the driving gears 31 and 32 and their respective potentiometers in sequence. To provide continuity of motion, one magnet is magnetically coupled to its respective actuating arm while the other magnet is simultaneously magnetically coupled to its respective stop member. The dial 59 and pointer 63 provide a visual indication of the setting or operation of potentiometers, or other devices, actuated by the drive mechanism.

Having described a preferred embodiment of the present invention, it is to be understood that although specific terms and examples are employed, they are used in a generic and descriptive sense and not for purposes of limitation; the scope of the invention being set forth in the following claims:

What is claimed is:

1. In a drive mechanism, a frame, a drive shaft journaled on said frame, a reversible motor to rotate said drive shaft, actuating arms of ferrous material secured to said drive shaft, driving gears journaled on said drive shaft adjacent to their respective actuating arms, permanent magnets secured to their respective driving gears for engagement by their respective actuating arms, driven devices actuated by their respective driving gears, and ferrous stop members secured to said frame for abutting engagement with their respective permanent magnets.

2. In a drive mechanism, a frame, a drive shaft journaled on said frame, a reversible motor to rotate said drive shaft, actuating arms of ferrous material secured to said drive shaft, driving gears journaled on said drive shaft adjacent to their respective actuating arms, permanent magnets secured to their respective driving gears for engagement by their respective actuating arms, driven devices actuated by their respective driving gears, ferrous stop members secured to said frame for abutting engagement with their respective permanent magnets, said arms and stop members being arranged to actuate said driven devices in sequence to provide continuity of motion during stopping of one driven device and starting of another driven device.

3. In a drive mechanism, a frame, a drive shaft journaled on said frame, a reversible motor to rotate said drive shaft, actuating arms of ferrous material secured to said drive shaft, driving gears journaled on said drive shaft adjacent to their respective actuating arms, permanent magnets secured to their respective driving gears for engagement by their respective actuating arms, driven devices actuated by their respective driving gears, ferrous stop members secured to said frame for abutting engagement with their respective permanent magnets, said stop members having coplanar abutment surfaces engageable by their respective magnets whereby one magnet engages its stop members while another magnet is simultaneously disengaged from its stop member by its actuating arm to thereby provide continuity of motion.

4. In a drive mechanism, a frame, a drive shaft journaled on said frame, a reversible motor to rotate said drive shaft, actuating arms of ferrous material secured to said drive shaft, driving gears journaled on said drive shaft adjacent to their respective actuating arms, permanent magnets secured to their respective driving gears for engagement by their respective actuating arms, driven devices actuated by their respective driving gears, ferrous stop members secured to said frame for abutting engagement with their respective permanent magnets, said stop members having coplanar abutment surfaces engageable by their respective magnets whereby one magnet engages its stop member while another magnet is simultaneously disengaged from its stop member by its actuating arm to thereby provide continuity of motion, and a friction clutch coupling said motor and drive shaft.

5. In a drive mechanism, a frame, a drive shaft journaled on said frame, a reversible motor to rotate said drive shaft, actuating arms of ferrous material secured to said drive shaft, driving gears journaled on said drive shaft adjacent to their respective actuating arms, permanent magnets secured to their respective driving gears for engagement by their respective actuating arms, driven devices actuated by their respective driving gears, ferrous stop members secured to said frame for abutting engagement with their respective permanent magnets, and driven gears interposed between their respective driving gears and driven devices.

6. In a drive mechanism, a frame, a drive shaft journaled on said frame, a reversible motor to rotate said drive shaft, actuating arms of ferrous material secured to said drive shaft, driving gears journaled on said drive shaft adjacent to their respective actuating arms, permanent magnets secured to their respective driving gears for engagement by their respective actuating arms, driven devices actuated by their respective driving gears, ferrous stop members secured to said frame for abutting engagement with their respective permanent magnets, and driven gears of different size interposed between their respective driving gears and driven devices.

7. In a drive mechanism, a frame, a drive shaft journaled on said frame, a reversible motor to rotate said drive shaft, actuating arms of ferrous material secured to said drive shaft, driving gears journaled on said drive shaft adjacent to their respective actuating arms, permanent magnets secured to their respective driving gears for engagement by their respective actuating arms, driven devices actuated by their respective driving gears, ferrous stop members secured to said frame for abutting engagement with their respective permanent magnets, one magnet being magnetically coupled to its related actuating arm while another magnet is magnetically coupled to its related stop member.

8. In a drive mechanism, a frame, a drive shaft journaled on said frame, a reversible motor to rotate said drive shaft, actuating arms of ferrous material secured to said drive shaft, driving gears journaled on said drive shaft adjacent to their respective actuating arms, permanent magnets secured to their respective driving gears for engagement by their respective actuating arms, driven devices actuated by their respective driving gears, ferrous stop members secured to said frame for abutting engagement with their respective permanent magnets, one magnet being magnetically coupled to its related actuating arm while another magnet is simultaneously therewith magnetically coupled to its related stop member.

9. In a drive mechanism, a frame, a drive shaft journaled on said frame, a reversible motor to rotate said drive shaft, actuating arms of ferrous material secured to said drive shaft, driving gears journaled on said drive shaft adjacent to their respective actuating arms, permanent magnets secured to their respective driving gears for engagement by their respective actuating arms, driven devices actuated by their respective driving gears, ferrous stop members secured to said frame for abutting engagement with their respective permanent magnets, one magnet being magnetically coupled to its related actuating arm while another magnet is simultaneously therewith magnetically coupled to its related stop member, and control means operative responsive to rotation of said drive shaft to stop said motor.

10. In a drive mechanism, a frame, a drive shaft journaled on said frame, a reversible motor to rotate said drive shaft, actuating arms of ferrous material secured to said drive shaft, driving gears journaled on said drive shaft adjacent to their respective actuating arms, permanent magnets secured to their respective driving gears for engagement by their respective actuating arms, driven devices actuated by their respective driving gears, ferrous stop members secured to said frame for abutting engagement with their respective permanent magnets, one magnet being magnetically coupled to its related actuating arm while another magnet is simultaneously therewith magnetically coupled to its related stop member, and means to indicate the rotational position of said drive shaft.

11. A drive mechanism for successively driving a plurality of devices, comprising a driving member movable back and forth between two positions, arms of magnetic material provided on said driving member, movable driven elements operatively connected to their respective devices, a magnet provided on each driven element and disposed in the line of travel of its respective arm for magnetic coupling engagement therewith, and fixed stop members of magnetic material mounted in the line of travel of their respective magnets for magnetic coupling engagement therewith.

12. A drive mechanism for successively driving a plurality of devices, comprising a driving member movable back and forth between two positions, arms of magnetic material provided on said driving member, movable driven elements operatively connected to their respective devices, a magnet provided on each driven element and disposed in the line of travel of its respective arm for magnetic coupling engagement therewith, and fixed stop members of magnetic material mounted in the line of travel of their respective magnets for magnetic coupling engagement therewith, said magnets trailing their respective arms during coupling engagement with their respective stop members.

13. A drive mechanism for successively driving a plurality of devices, comprising a driving member movable back and forth between two positions, arms of magnetic material provided on said driving member, movable driven elements operatively connected to their respective devices, a magnet provided on each driven element and disposed in the line of travel of its respective arm for magnetic coupling engagement therewith, and fixed stop members of magnetic material mounted in the line of travel of their respective magnets for magnetic coupling engagement therewith, said magnets trailing their respective arms during coupling engagement with their respective stop members, said arms acting simultaneously to engage one magnet against its stop member and to disengage another magnet from its stop member to provide continuity of motion of said devices.

14. A drive mechanism for successively driving a plurality of devices, comprising a driving member movable back and forth between two positions, arms of magnetic material provided on said driving member, movable driven elements operatively connected to their respective devices, a magnet provided on each driven element and disposed in the line of travel of its respective arm for magnetic coupling engagement therewith, and fixed stop members of magnetic material mounted in the line of travel of their respective magnets for magnetic coupling engagement therewith, said magnets trailing their respective arms during coupling engagement with their respective stop members, said arms acting simultaneously to engage one magnet against its stop member and to disengage another magnet from its stop member to provide continuity of motion of said devices, and means to drive said driving member.

No references cited.

UNITED STATES PATENT OFFICE
CERTIFICATE OF CORRECTION

Patent No. 2,912,883                             November 17, 1959

Charles L. Cohen

It is hereby certified that error appears in the printed specification of the above numbered patent requiring correction and that the said Letters Patent should read as corrected below.

Column 2, line 46, for "and 3 the actuating arm 26 moves the magnet 42 into" read -- and 3, the actuating arm 27 moves the magnet 43 into --.

Signed and sealed this 10th day of May 1960.

(SEAL)
Attest:

KARL H. AXLINE
Attesting Officer

ROBERT C. WATSON
Commissioner of Patents